United States Patent
Reichenberger et al.

[19]

[11] Patent Number: 6,119,908
[45] Date of Patent: Sep. 19, 2000

[54] ARTICLE CARRIER ASSEMBLY HAVING A CROSS RAIL ASSEMBLY WITH A TURNABLE LOCKING MECHANISM

[75] Inventors: Fritz Reichenberger; Stefan Lips, both of Aurora, Canada

[73] Assignee: Decoma International Inc., Ontario, Canada

[21] Appl. No.: 09/054,481

[22] Filed: Apr. 3, 1998

Related U.S. Application Data

[60] Provisional application No. 60/042,628, Apr. 3, 1997.

[51] Int. Cl.⁷ ...................................................... B60R 9/04
[52] U.S. Cl. ........................................... 224/321; 224/326
[58] Field of Search .................................... 224/321, 326, 224/325, 309, 329, 331; 410/144, 145, 146, 147, 148, 149, 150, 139, 132, 130

[56] References Cited

U.S. PATENT DOCUMENTS

| | | |
|---|---|---|
| 2,888,178 | 5/1959 | Olson . |
| 4,156,497 | 5/1979 | Bott . |
| 4,182,471 | 1/1980 | Bott . |
| 4,294,388 | 10/1981 | Wunstel . |
| 4,295,587 | 10/1981 | Bott . |
| 4,364,500 | 12/1982 | Bott . |
| 4,460,116 | 7/1984 | Bott . |
| 4,473,178 | 9/1984 | Bott . |
| 4,487,348 | 12/1984 | Mareydt . |
| 4,588,117 | 5/1986 | Bott . |
| 4,684,048 | 8/1987 | Bott . |
| 4,705,198 | 11/1987 | Kamaya . |
| 4,972,983 | 11/1990 | Bott . |
| 5,037,153 | 8/1991 | Stark ........................................ 296/37.6 |
| 5,190,198 | 3/1993 | Cucheran . |
| 5,205,453 | 4/1993 | Pudney et al. . |
| 5,226,570 | 7/1993 | Pedrini . |
| 5,385,285 | 1/1995 | Cucheran et al. . |
| 5,397,042 | 3/1995 | Pedrini . |
| 5,423,465 | 6/1995 | Kauka et al. . |
| 5,470,003 | 11/1995 | Cucheran . |
| 5,472,256 | 12/1995 | Tucker . |
| 5,511,708 | 4/1996 | Cronce et al. . |
| 5,577,649 | 11/1996 | Lee, Jr. et al. . |
| 5,577,650 | 11/1996 | Stapleton . |
| 5,579,970 | 12/1996 | Cucheran et al. . |
| 5,588,572 | 12/1996 | Cronce et al. . |
| 5,622,298 | 4/1997 | Cucheran et al. . |
| 5,657,914 | 8/1997 | Stapleton . |
| 5,715,980 | 2/1998 | Blankenburg et al. .................. 224/321 |
| 5,758,810 | 6/1998 | Stapleton .................................. 224/321 |

*Primary Examiner*—Linda J. Sholl
*Attorney, Agent, or Firm*—Pillsbury Madison & Sutro, LLP

[57] ABSTRACT

The present invention is an article carrier assembly for mounting on an exterior surface of a motor vehicle The article carrier includes a pair of elongated side rails constructed and arranged to be mounted on an exterior surface of the motor vehicle. The side rails extend generally parallel to one another in a spaced apart relation. An elongated cross rail assembly is constructed and arranged to be mounted transversely between and releaseably lockable along the side rails in a range of operating positions. The cross rail assembly has rail locking structures mounted on opposite ends thereof. A rotatable rod gangs the rail locking structures together for cooperative movement thereof between locked positions wherein the rail locking structures engage the side rails to lock the cross rail assembly in one of the operating positions and disengage positions permitting longitudinal travel of the cross rail assembly along the side rails. An actuator is operatively connected to the rotatable rod for effecting the cooperative movement. The cross rail assembly is constructed and arranged such that an operator standing on one side of the vehicle can manipulate the actuator and move the cross rail assembly between the operating positions.

17 Claims, 6 Drawing Sheets

ARTICLE CARRIER ASSEMBLY HAVING A CROSS RAIL ASSEMBLY WITH A TURNABLE LOCKING MECHANISM

This application claims benefit of provisional application Ser. No. 60/042,628 filed Apr. 3, 1997.

The present invention relates to article carrier assemblies used to transport cargo on the exterior of motor vehicles.

Article carrier assemblies are well-known as a means for transporting cargo on the exterior of a motor vehicle. Conventionally, these article carrier assemblies include a pair of side rails with cross rails mounted transversely thereacross. The cargo is usually laid across or tied down to the cross rails. Oftentimes, the size of the cargo to be transported varies. Thus, it is desirable to be able to adjust the positions of one or more of the cross rails in order to more suitably accommodate articles of cargo of varying sizes.

Typically, the cross rails of article carrier assemblies known heretofore were adjusted by manually unlocking each end thereof from the side rails. This required the operator to first unlock the cross rail from one side of the vehicle, then unlock the cross rail from the other side of the vehicle, adjust the cross rail to a desired position, and then re-lock the cross rail from each side of the vehicle.

In order to reduce the need for an operator to unlock and then re-lock the cross rail from each side of the vehicle, article carrier assemblies having cross rails which can be manually unlocked, adjusted longitudinally to a desired position, and then re-locked while remaining on one side of the vehicle have been heretofore proposed. Examples of such article carrier assemblies are disclosed in U.S. Pat. No. 5,190,198 and PCT Application WO 94/10007. These article carrier assemblies rely on a complex arrangement of cables and pulleys in order to allow the cross rails thereof to be locked and unlocked from one side of the vehicle.

Thus, there exists a need for an article carrier assembly having a cross rail assembly whose position can be adjusted while remaining on one side of the vehicle, yet having a simplified and durable construction.

It is therefore an object of the present invention to provide an article carrier assembly which meets the needs expressed above. The present invention is an article carrier assembly for mounting on an exterior surface of a motor vehicle. The article carrier includes a pair of elongated side rails constructed and arranged to be mounted on an exterior surface of the motor vehicle. The side rails extend generally parallel to one another in a spaced apart relation. An elongated cross rail assembly is constructed and arranged to be mounted transversely between and releaseably lockable along the side rails in a range of operating positions. The cross rail assembly has rail locking structures mounted on opposite ends thereof. A rotatable rod gangs the rail locking structures together for cooperative movement thereof between locked positions wherein the rail locking structures engage the side rails to lock the cross rail assembly in one of the operating positions and disengage positions permitting longitudinal travel of the cross rail assembly along the side rails. An actuator is operatively connected to the rotatable rod for effecting the cooperative movement. The cross rail assembly is constructed and arranged such that an operator standing on one side of the vehicle can manipulate the actuator and move the cross rail assembly between the operating positions.

BRIEF DESCRIPTION OF THE DRAWINGS

FIG. 7 is an end view of a support structure of the adjustable cross rail assembly.

DESCRIPTION OF THE PREFERRED EMBODIMENT

Figure 1:
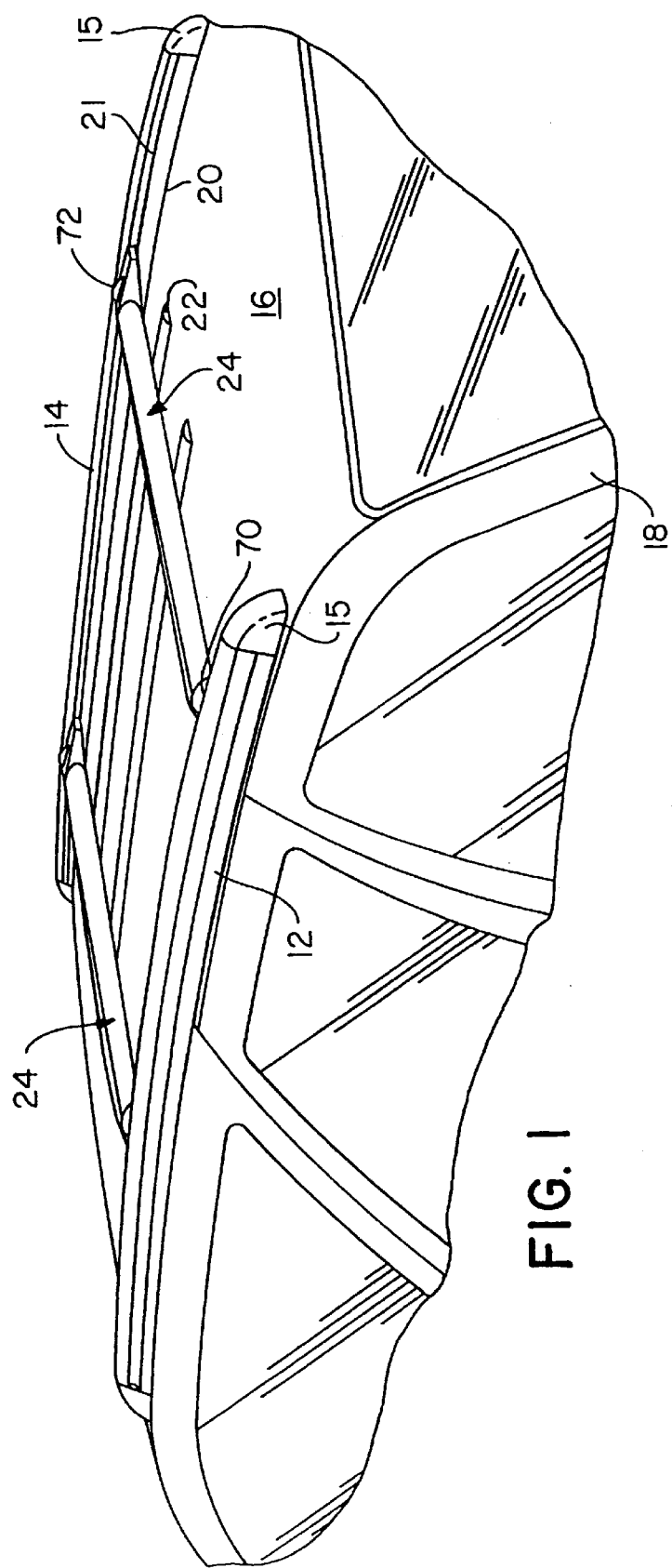
FIG. 1 is a perspective view of a roof portion of a motor vehicle having a article carrier assembly mounted thereon, provided in accordance with the principles of the present invention.

Referring to the drawings, an article carrier assembly is shown, generally indicated at 10, which embodies the principles of the present invention.

As shown in FIG. 1, the article carrier assembly 10 includes a pair of side rail structures 12 and 14 mounted generally parallel to one another in fixed, spaced relation on an upwardly facing exterior body surface 16 of a motor vehicle 18 and extending longitudinally of the vehicle. In the illustrated embodiment, the article carrier assembly 10 is disposed on a roof panel of the vehicle. It can be appreciated, however, that the article carrier assembly 10 can be mounted on the outer surface of a trunk of the vehicle 18 or to the side rails of a pick-up truck box.

Figure 3:
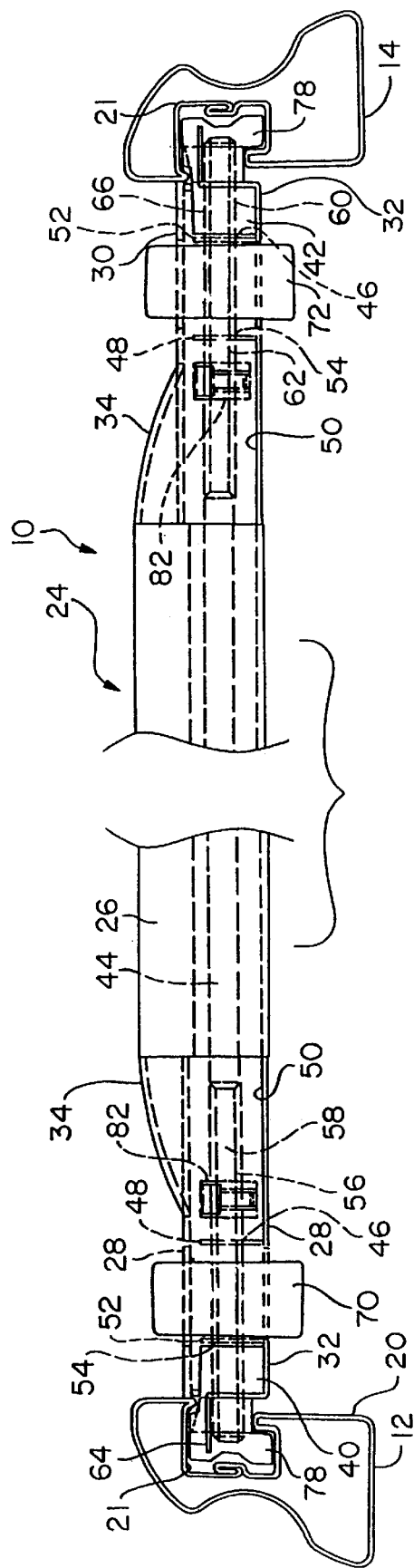
FIG. 3 is an end view of the cross rail assembly of the article carrier assembly of FIG. 1, shown mounted to side rail structures of the article carrier assembly.

Each of the side rail structures 12 and 14 is generally identical, being roll-formed and of generally hollow configuration, as best shown in FIG. 3. While roll-forming is indicated above as an exemplary mode of construction, it will be understood that other modes of construction are contemplated as well, as, for example, extrusion forming. Each side rail structure 12 and 14 has caps 15 at each end thereof and each side rail structure includes an elongated groove 21 extending generally the length of inner side wall 20.

The side rail structures 12 and 14 may be formed of any suitable material for supporting articles, such as metal, plastic and combinations thereof. Side rail structures 12 and 14 are fixed to the vehicle body surface 16 by fasteners, adhesive or the like.

As shown in FIG. 1, slats 22 are spaced between the side rail structures 12 and 14. The slats 22 are fixed to the exterior body surface 16 in a manner similar to that of the side rail structures 12 and 14. Cargo may be placed on the slats 22 and secured by tying to a cross rail assembly, generally indicated at 24. Thus, the slats 22 provide protection to the exterior body surface 16 of the vehicle.

The article carrier assembly 10 includes at least one adjustable cross rail assembly 24 mounted transversely with respect to the side rail structures 12 and 14 in one of a range of operating positions within which longitudinal adjusting movement of the adjustable cross rail assembly 24 can be permitted so that articles of cargo to be transported by the motor vehicle can be disposed on and supported by the cross rail assembly 24. In the illustrated embodiment, two cross rail assemblies are provided in spaced relation. Each cross rail assembly 24 is adjustable with respect to the side rails structures 12, 14. It can be appreciated that any number of cross rail assemblies 24 may be provided. Further, instead of providing two adjustable cross rail assemblies, a stationary cross rail may be provided together with one or more adjustable cross rail assemblies.

Each adjustable cross rail assembly 24 is preferably formed from light weight steel or metal or from molded plastic so as to be easily slidable with respect to the side rail structures, as will be explained in more detail below.

In the illustrated embodiment, each adjustable cross rail assembly 24 includes a roll-formed, C-shaped, central tubular portion 26 and a pair of supports, generally indicated at 28 and 30, extending from opposite ends of the central tubular portion 26. The central tubular portion 26 has a T-groove 27 therein which receives bolting for securing cargo thereto.

Figure 2:
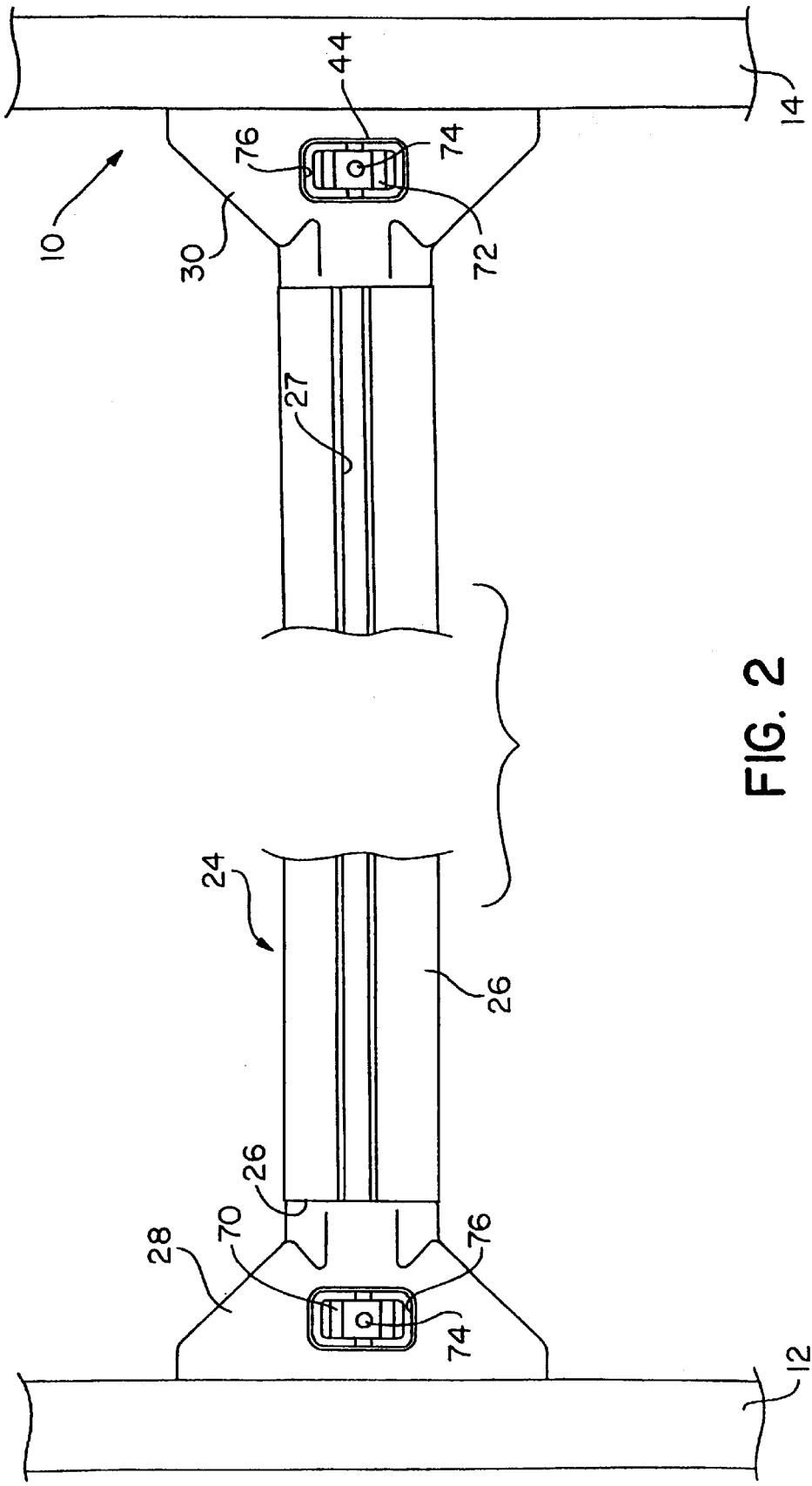
FIG. 2 is plan view of an adjustable cross rail assembly of FIG. 1, engaged with the side rail structures.

With reference to FIG. 2, each support 28 and 30 includes a housing 32 and a cover 34 covering an upper portion of the housing 32. Each support 28 and 30 includes arm portions 36 extending therefrom. As shown in FIG. 7, each arm portion 36 is of generally C-shaped cross-section and sized to be received in each end of the central tubular portion 26 to be retained therein by welding or by fasteners or the like.

Figure 4:
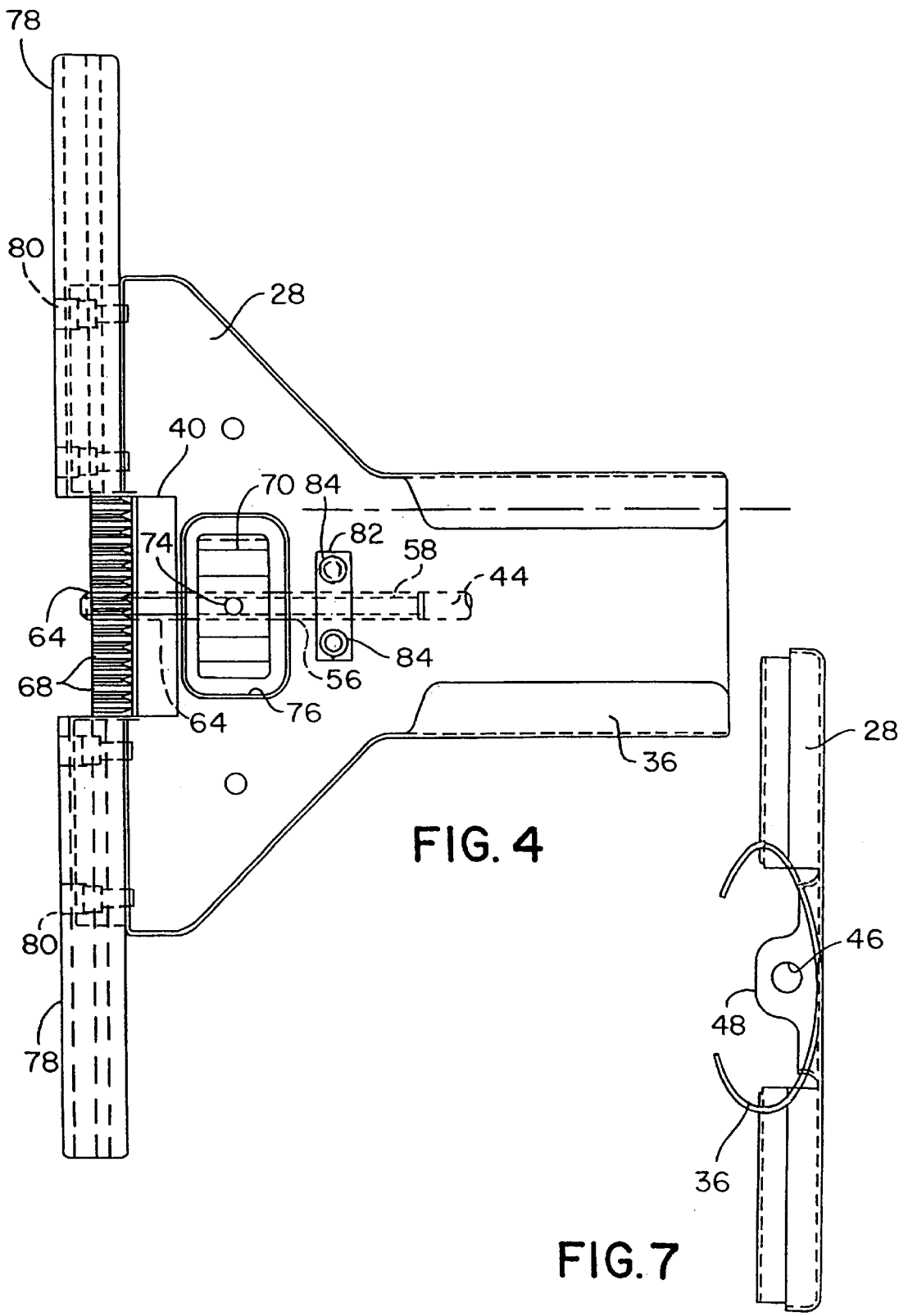
FIG. 4 is view of one end of the cross adjustable rail assembly shown with a cover thereof removed for clarity of illustration.
Figure 5:
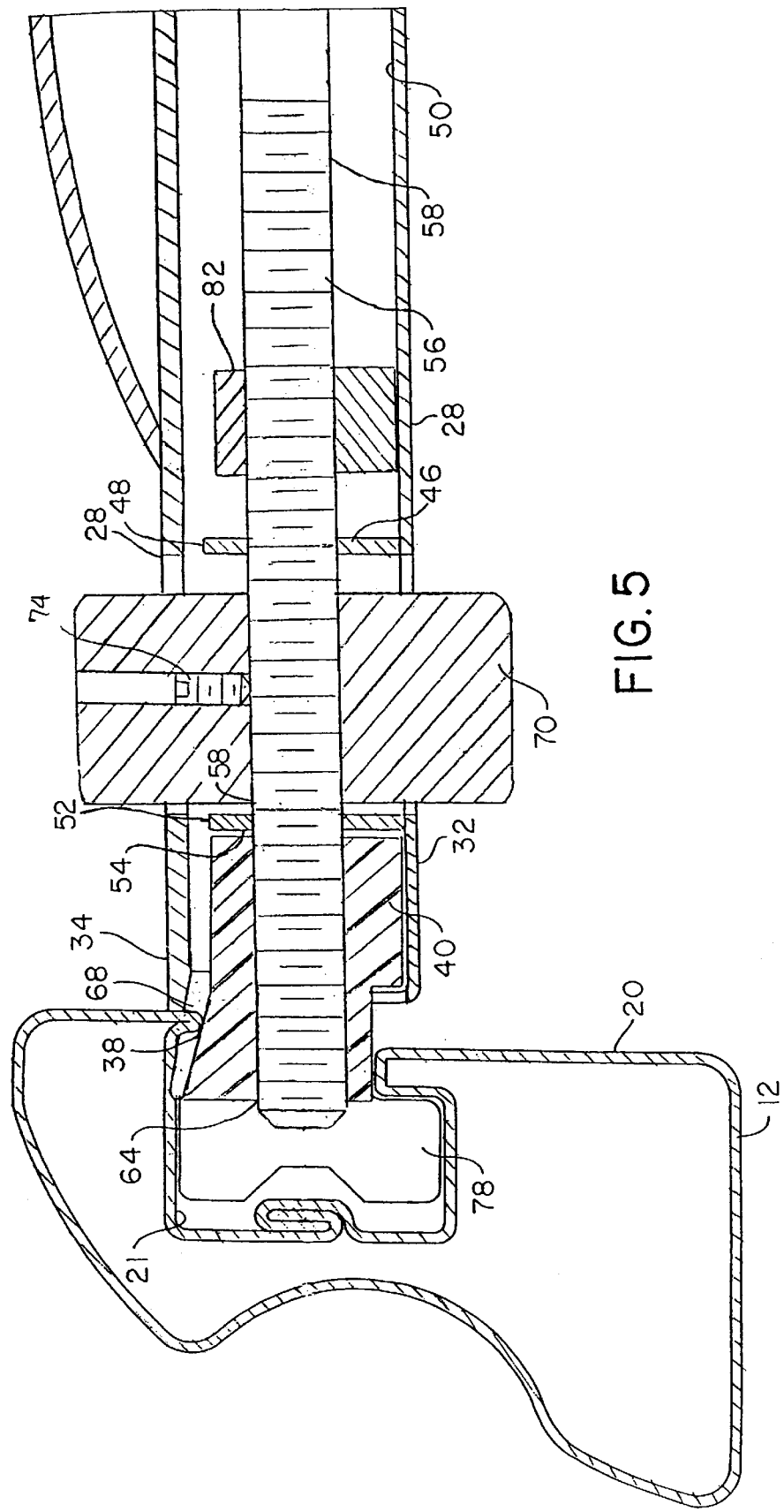
FIG. 5 is an enlarged view, partially in section, of the adjustable cross rail assembly shown with the side rail locking structure thereof in an engaged position with respect to a side rail structure.
Figure 6:
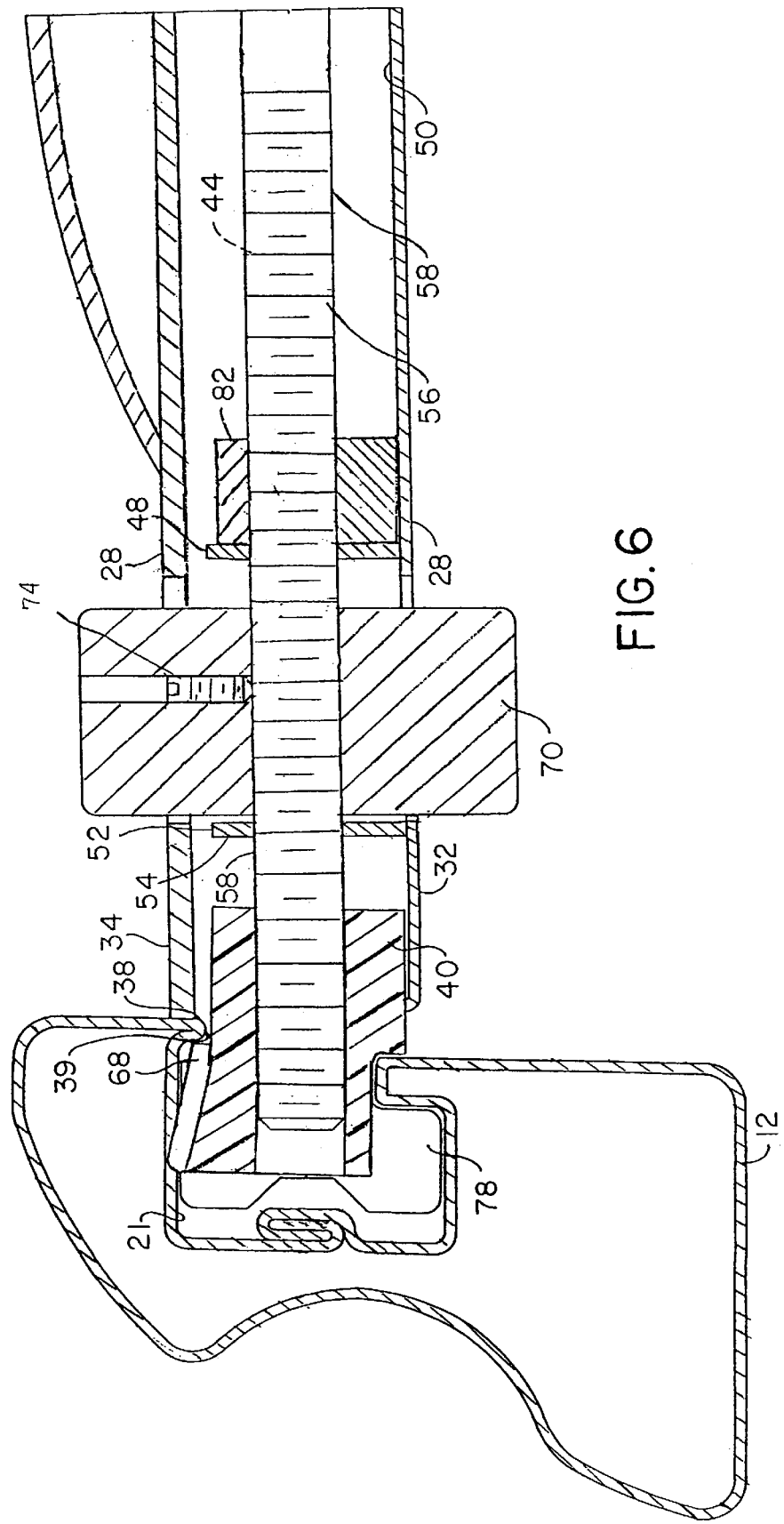
FIG. 6 is a view similar to FIG. 5, but shows the side rail locking structure in an unlocked position with respect to a side rail structure.

Each of the side rail structures 12, 14 have serrations 38, best seen in FIGS. 4, 5, and 6, which are cut, pressed or otherwise formed in a downwardly facing surface 39 and are provided along the extent of the groove 21. The adjustable cross rail assembly 24 includes a pair of side rail locking structures 40 and 42 operatively mounted on opposing ends thereof and carried by each support 28 and 30, respectively. The side rail locking structures are preferably made from an elastomeric material.

As best shown in FIGS. 2 and 3, the side rail locking structures 40 and 42 are ganged together by a turnable motion transmitting structure in the form of a rod 44 which extends the length of the central tubular portion 26. Each support 28 and 30 includes an aperture 46 (FIGS. 3 and 7) defined in flange member 48 which extends upwardly from the housing lower surface 50. A second flange member 52 is provided on each support 28 and 30 and each member 52 includes a second aperture 54. The rod 44 is received in the apertures 46 and 54. End 56 of rod 44 includes right-handed threads 58, while end 60 thereof includes left handed threads 62. Side rail locking structure 40 includes a threaded bore 64 which receives threads 58, while side rail locking structure 42 includes a threaded bore 66 which receives threads 62. As best shown in FIG. 4, each of the side rail locking structures 40 and 42 includes a plurality of serrations 68 defined in an upwardly facing surface thereof. It is noted that although not shown in FIG. 4, the side rail locking structure 42 at the other end of the adjustable cross rail assembly 24 includes serrations identical to those of the side rail locking structure 40. The serrations 68 are constructed and arranged to mate with the serrations 38 defined in the downwardly facing surface 39 of the side rail structures 12 and 14, as will be explained in more detail below.

With reference to FIGS. 2 and 3, actuating structure is provided for moving the side rail locking structures 40 and 42 between engaged and disengaged positions in response to manual operation. In the illustrated embodiment, the actuating structure includes turning elements 70 and 72 which, in the illustrated embodiment, are in the form of manually engageable wheel members. Turning element 70 is threadedly engaged with threads 58 at end 56 of the rod 44, while turning element 72 is threadedly engaged with threads 62 at end 60 of the rod 44. Each turning element 70 and 72 is fixed with respect to the rod 44 via a set screw 74. As shown in FIG. 2, the turning elements 70 and 72 extend through respective openings 76 in the covers 28 and 30 in a position to be rotated manually by an operator standing at a side of a vehicle.

With reference to FIG. 3, and best shown in FIG. 4, elongate guiding elements 78 are fixed to ends of each support 28 and 30 by screws 80 or the like. As shown, the guiding elements 78 are sized and configured to be slidably received in each associated groove 21 to guide the associated adjustable cross rail assembly 24 when it is being longitudinally moved with respect to the side rail structures within a range of operating positions to thereby adjust the position of the assembly 24, as will become more apparent below. Preferably, the guide members 78 are made of low friction material such as, for example, nylon.

In certain circumstances, it is desirable to adjust the position of one or more of the cross rail assemblies longitudinally with respect to the side rail structures 12,14 from an initial one of the range of operating positions to a desired one of a range of operating positions accommodate cargo of different sizes. With reference to the drawings, particularly FIGS. 3, 5 and 6, the procedure for adjusting a cross rail assembly will be appreciated.

The operator, standing at one side of the vehicle, manually turns one of the turning elements 70 or 72. The major extent of the rod 44 at its central portion is equivalent to a turnbuckle. Thus, since the side rail locking structures 40 and 42 are threadedly engaged with the rod 44 for rectilinear motion without any rotational motion thereof, when the turning element 70 or 72 is rotated, the side rail locking structures 40 and 42 will move inwardly or outwardly depending upon the direction of rotation of the central portion of the rod 44. In the illustrated embodiment, in order to lock cross rail assembly 24 in a desired one of the range of operating position with respect to the side rail structures 12 and 14, a turning element is turned which rotates the rod 44 so that the side rail locking structures 40 and 42 will move inwardly (FIG. 5) to interengage the serrations 68 of the side rail locking structures with the serrations 38 in the side rail structures 12 and 14. Rotation of the rod 44 in the opposite direction moves the side rail locking structures 40 and 42 outwardly (FIG. 6), disengaging the serration engagement and permitting the adjustable cross rail assembly 24 to slide in the grooves 21 and be moved longitudinally with respect to the side rail structures 12,14 to any desired position within the range of operating positions.

To prevent over tightening of the side rail locking structures 40 and 42 and possible deformation thereof, travel stops 82 are provided. Each travel stop 82 is defined by two complimentary members coupled together by screws 84. Each travel stop 82 is threaded on an associated end of the rod 44 and cannot turn with the rod, but moves along the axis of the rod 44 as the rod is turned. The stops 82 engage disengagement stopping structure in the form of the fixed stopping member 48 (FIG. 6) to prevent further turning movement of the rod 44 and outward movement of the side rail locking structures 40, 42. Likewise, the inner surfaces of the rail locking structures 40, 42 engage engagement stopping structure in the form of the flange member 52 to limit inward movement of the side rail locking structures 40,42 and overtightening of the locking structures 40,42 with the side rails 12.

Although two stops are shown, it can be appreciated that one stop will provide the necessary protection from overtightening.

Although in the illustrated embodiment the locking structures 40, 42 move inwardly to the engaged positions thereof and outwardly to the disengaged positions thereof, it can be appreciated that the assembly 24 may be configured to lock as the side rail locking structures move outwardly and to unlock as the side rail locking structures move inwardly. Further, it can be appreciated that the interengaging serrations may be provided at other locations on the side rail locking structures and the side rail structures so long as they are in a position to ensure interengagement thereof. Furthermore, it is contemplated that a construction which allows the cross rail assembly to be moved through a range of infinite operating positions may be used, an example of which is disclosed in the U.S. patent application of Drouillard et al. entitled "Article Carrier Assembly Having a Cross Rail Assembly Adjustable Within a Range of Infinite Operating Positions" being filed on even date herewith, Ser. No. 09/054,495, the entirety of which is hereby incorporated into the present application by reference. It is also to be understood that engaging pins to be received in longitudinally spaced apertures formed on the side rail structures may also be used in place of the side rail locking structures described hereinabove. An example of such a construction is disclosed in the U.S. patent application of Kuntze et al., entitled "Article Carrier Assembly Having a Cross Rail Assembly Longitudinally Adjustable from One Side of a Motor Vehicle," Ser. No. 09/054,482.

It can be seen that the article carrier assembly 10 of the present invention provides an effective means of moving and then locking a cross rail assembly in any one of a range of operating positions along the side rails thereof.

It will be thus seen that the objects of the present invention have been fully and effectively accomplished. It will be realized, however, that the foregoing preferred specific embodiment has been shown for the purpose of illustrating the functional and structural principles of the present invention and is subject to change without departure from such principles. Therefore, the present invention includes all modifications encompassed within the spirit and scope of the following claims.

What is claimed is:

1. An article carrier assembly for mounting on an exterior surface of a motor vehicle, said article carrier assembly comprising:

a pair of elongated side rails constructed and arranged to be mounted on an exterior surface of the motor vehicle, said side rails extending generally parallel to one another in a spaced apart relation;

each of said side rails having a plurality of serrated engaged teeth disposed along a longitudinal extent thereof;

an elongated cross rail assembly constructed and arranged to be mounted transversely between and releaseably lockable along said side rails in a range of operating positions, said cross rail assembly comprising:

rail locking structures mounted on opposite ends thereof, each of said rail locking structures including a plurality of serrated engaging teeth;

a rotatable rod ganging said rail locking structures together for cooperative movement thereof between locked positions wherein said serrated engaging teeth engage and cooperate with said serrated engagement to lock said cross rail assembly in one of said operating positions and disengage positions wherein said serrated engaging teeth are disengaged from said serrated engagement teeth to permit longitudinal travel of said cross rail assembly along said side rails;

a pair of turning elements each being disposed at a respective one of the opposite ends of said cross rail assembly, said turning elements each being operatively connected to said rotatable rod so that said rod can be rotated to affect said cooperative movement from either side of the vehicle by operating an associated turning element;

said cross rail assembly being constructed and arranged such that an operator can operate either of said turning elements while remaining on one side of the vehicle and move said cross rail assembly between said operating positions.

2. The article carrier assembly of claim 1 wherein said side rails have inwardly facing grooves configured to face inwardly toward one another when said side rails are mounted on the upwardly facing exterior surface of the motor vehicle, said serrated engagement teeth being formed on surfaces of said inwardly facing grooves which face downardly;

said serrated engagement teeth on said rail locking structures of said adjustable cross rail assembly being formed on surfaces of said rail locking structures which face upwardly when said adjustable cross rail assembly is mounted transversely with respect to said side rails in one of said range of operating positions such that said serrated engaging teeth of each of said rail locking structures cooperate with said serrated engagement teeth of each of said inwardly facing grooves on said side rails when said rail locking structures are in the respective locked positions thereof to thereby lock said adjustable cross rail assembly in one of said range of operating positions.

3. The article carrier assembly of claim 1 wherein said adjustable cross rail assembly comprises:

disengagement stopping structure constructed and arranged to limit outward movement of said rail locking structures from the respective locked positions thereof to the respective disengage positions thereof; and engagement stopping structure constructed and arranged to limit inward movement of said rail locking structures from the respective disengage positions thereof to the respective locked positions thereof so as to prevent overtightening of said rail locking structures with said side rails.

4. An article carrier assembly according to claim 3 wherein said rod has threaded portions on opposing ends thereof, each of said threaded portions being threaded in opposite directions with respect to one another;

each of said rail locking structures having a threaded bore formed therein, each of said threaded bores being threadingly engaged with an associated threaded portion of said rod such that (1) turning of said rod in a first turning direction simultaneously rectilinearly moves said rail locking structures inwardly toward the respective locked positions thereof and (2) turning of said rod in a second turning direction simultaneously rectlinearly moves said rail locking structures outwardly toward the respective disengage positions thereof;

said rod including a pair of traveling stops each having a threaded bore formed therethrough, the threaded bore of each of said traveling stops being threadingly engaged with an associated one of said threaded portions of said rod such that (1) turning of said rod in a first turning direction simultaneously, rectilinearly moves said traveling stops inwardly as said rail locking structures are moved inwardly toward and into the respective locked positions thereof and (2) turning of said rod in a second turning direction simultaneously rectilinearly moves said traveling stops outwardly as said rail locking structures are moved outwardly toward and into the respective disengage positions thereof;

said disengagement stopping structure comprising inner fixed stopping members fixedly attached within said adjustable cross rail assembly outwardly of said traveling stops such that said traveling stops engage said inner fixed stopping members as said rod is turned in said second turning direction thereof to move said rail locking structures outwardly towards and into said respective disengage positions thereof to thereby prevent further outward movement of said rail locking structures;

said engagement stopping structure comprising outer fixed stopping members fixedly attached within said adjustable cross rail assembly inwardly of said rail locking structures such that said rail locking structures engage said outer fixed stopping members as said rod is turned in said first turning direction thereof to move said rail locking structures inwardly toward and into said respective locked positions thereof to thereby prevent further inward movement of said rail locking structures so as to prevent overtightening of said rail locking structures with said side rails.

5. The article carrier assembly of claim 1 wherein said rail locking structures are formed from an elastomeric material.

6. The article carrier assembly of claim 2 wherein said adjustable cross rail assembly comprises:

guiding elements disposed on the opposing ends of said adjustable cross rail assembly, each of said guiding elements being configured to be slidably mounted in the inwardly facing groove of an associated side rail when said adjustable cross rail assembly is mounted transversely between said side rails in one of said range of operating positions such that said guiding elements guide and support said adjustable cross rail assembly during longitudinal travel of said cross rail assembly along said side rail.

7. The article carrier assembly of claim 6 wherein each of said guiding elements is made of nylon.

8. The article carrier assembly of claim 6 wherein each of said turning elements is a cylindrical member having a central, cylindrical bore therethrough and wherein said rod is inserted through each of said cylindrical bores and fixed therein.

9. The article carrier assembly of claim 8 wherein said rod is fixed in each of said cylindrical bores of said cylindrical members by screws.

10. The article carrier assembly of claim 8 wherein said adjustable cross rail assembly comprises:

disengagement stopping structure constructed and arranged to limit outward movement of said rail locking structures from the respective locked positions thereof to the respective disengage positions thereof; and engagement stopping structure constructed and arranged to limit inward movement of said rail locking structures to the respective disengaged positions thereof to the respective locked positions thereof so as to prevent overtightening of said rail locking structures with said side rails.

11. The article carrier assembly of claim 8 wherein said rod has threaded portions on opposing ends thereof, each of said threaded portions being threaded in the opposite directions with respect to one another;

each of said rail locking structures having a threaded bore formed therein, each of said threaded bores being threadingly engaged with an associated threaded portion end of said rod such that (1) turning of said rod in a first turning direction simultaneously rectilinearly moves said rail locking structures inwardly toward and into the respective locked positions thereof and (2) turning of said rod in a second turning direction simultaneously rectilinearly moves rail locking structures outwardly toward and into the respective disengage positions thereof.

12. The article carrier assembly of claim 1 wherein said turning elements are cylindrical members each having a central, cylindrical bore therethrough and said rod is inserted through said cylindrical bores of said cylindrical members and fixed therein.

13. The article carrier assembly of claim 12 wherein said rod is fixed in said cylindrical bores of said cylindrical members by screws.

14. The article carrier assembly of claim 1 wherein said adjustable cross rail assembly comprises:

guiding elements disposed on the opposing ends of said adjustable cross rail assembly, each of said guiding elements being configured to be slidably mounted in an inwardly facing groove of an associated one of said side rails when said adjustable cross rail assembly is mounted transversely with respect to said side rails in one of said range of operating positions such that said guiding elements guide and support said adjustable cross rail assembly during longitudinal travel along said side rails.

15. The article carrier assembly of claim 12 wherein said rod has threaded portions on opposing ends thereof, each of said threaded portions being threaded in opposite directions with respect to one another, each of said rail locking structures having a threaded bore formed therein, each of said threaded bores being threadingly engaged with an associated threaded portion of said rod such that (1) turning of said rod in a first turning direction simultaneously rectilinearly moves said rail locking structures inwardly toward and into the respective locked positions thereof and (2) turning of said rod in a second turning direction simultaneously rectilinearly moves said rail locking structures outwardly toward and into the respective disengage positions thereof.

16. An article carrier assembly according to claim 1 wherein said rail locking structures move outwardly away from one another when moved from the respective engage positions thereof to the respective disengage positions thereof;

said rail locking structures moving inwardly toward one another when moved from the respective disengage positions thereof to the respective locked positions thereof.

17. An article carrier according to claim 1 wherein rotating said rod in a first turning direction thereof simultaneously moves said rail locking structures toward and into the respective locked positions thereof and rotating said rod in a second turning direction thereof simultaneously moves said rail locking structures toward and into the respective disengage positions thereof.

* * * * *